US 6,584,534 B1

United States Patent
Kobayashi

(10) Patent No.: US 6,584,534 B1
(45) Date of Patent: Jun. 24, 2003

(54) COMBINED ISOCHRONOUS AND ASYNCHRONOUS COMMUNICATION APPARATUS, METHOD AND INTERFACE

(75) Inventor: Takashi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,222

(22) Filed: Jan. 25, 1999

(30) Foreign Application Priority Data

Jan. 27, 1998 (JP) .......................................... 10-013933

(51) Int. Cl.⁷ .............................................. G60F 13/38
(52) U.S. Cl. ...................................................... 710/305
(58) Field of Search .................................. 710/100, 305, 710/306, 313, 107

(56) References Cited

U.S. PATENT DOCUMENTS 5,915,127 A * 6/1999 Ogawa et al. ................. 710/58
5,933,430 A * 8/1999 Osakabe et al. ............. 370/421
6,032,211 A * 2/2000 Hewitt ......................... 710/107
6,078,783 A * 6/2000 Kawamura et al. .......... 370/362

* cited by examiner

Primary Examiner—Glenn A. Auve
(74) Attorney, Agent, or Firm—Fitzpatrick, Cella, Harper & Scinto

(57) ABSTRACT

A digital interface having two different transfer modes (for example isochronous transfer mode and asynchronous transfer mode) is composed of a first processing unit of controlling communication based on the first communication mode and a second processing unit for controlling communication based on the second communication mode. The first processing unit and the second processing unit are respectively connected to different internal buses, thereby enabling parallel processing of the data transmitted or received in the first and second communication modes.

Thus the complexity of communication process in the digital equipment can be reduced and smooth communication with the external network can be realized.

10 Claims, 9 Drawing Sheets

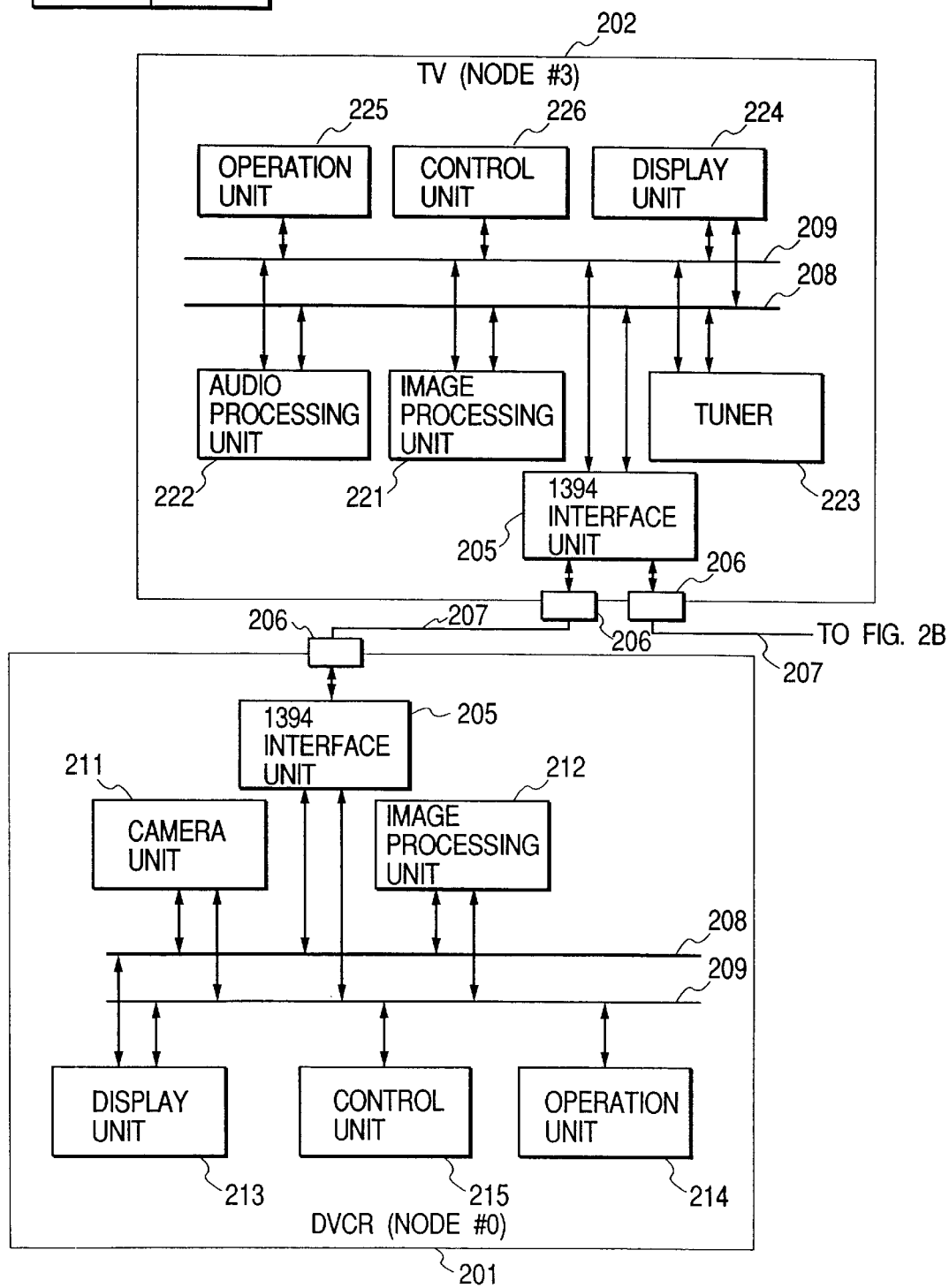

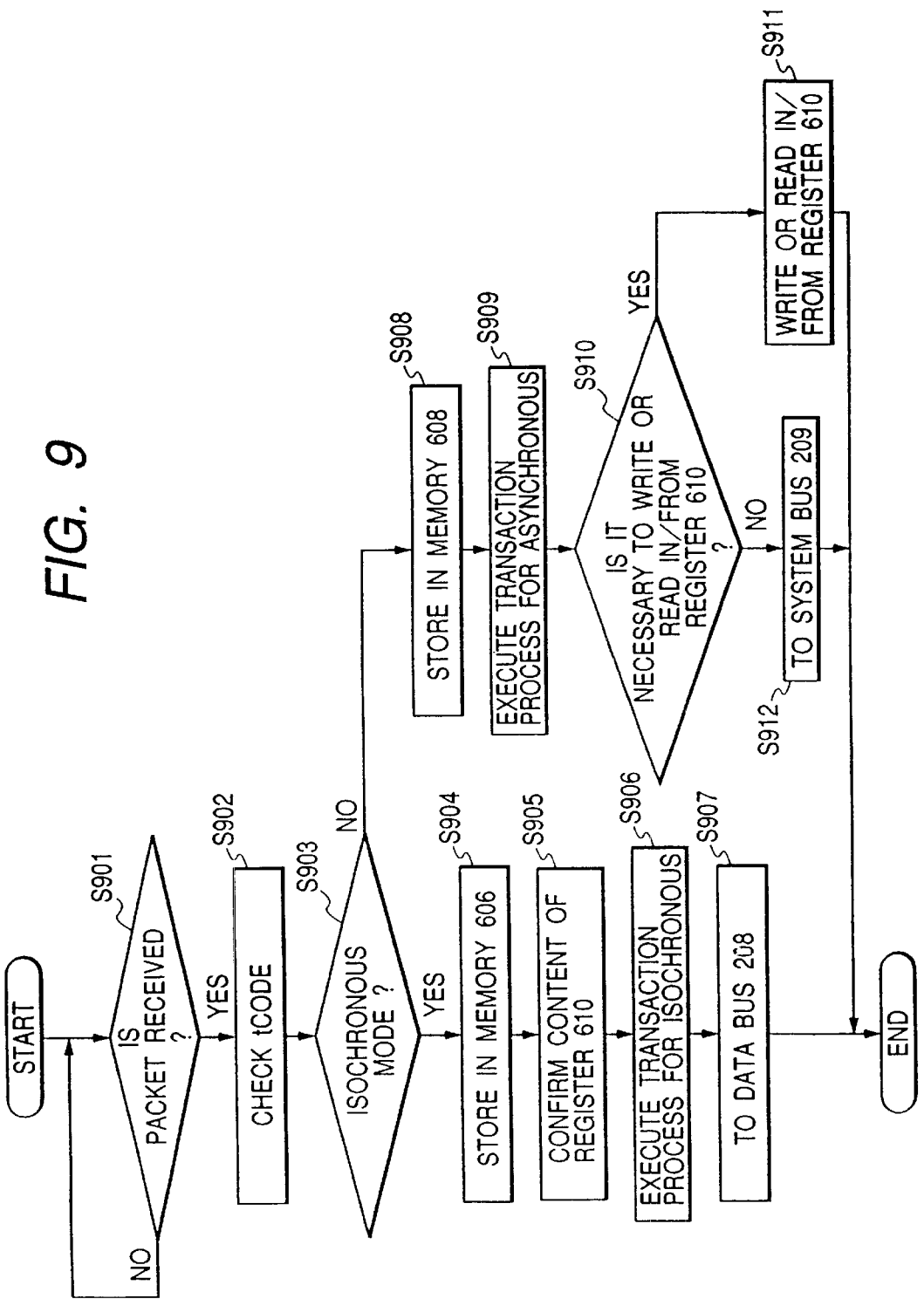

COMBINED ISOCHRONOUS AND ASYNCHRONOUS COMMUNICATION APPARATUS, METHOD AND INTERFACE

BACKGROUND OF THE INVENTION

1. Field of the Invention

The present invention relates to a communication apparatus provided with synchronous transfer function and asynchronous transfer function, a method and a digital interface therefore.

2. Related Background Art

Recently various developments have been made to connect various digital devices such as a personal computer, a printer, a hard disk, a digital camera, a digital video camera, etc., with a high-speed digital interface common to these devices.

Among the high-speed digital interfaces developed for such objective, there is known a digital interface based on the IEEE1394-1995 standard (hereinafter called 1394 interface). The detailed explanation on the IEEE1394-1995 standard is disclosed in the IEEE Standard for a High Performance Serial Bus (IEEE Std 1394-1995), approved and published by the IEEE (Institute of Electrical and Electronics Engineers, Inc.) Standard Committee.

The 1394 interface is superior to the conventional digital interface in certain characteristic features, and one of such features is that the 1394 has two transfer modes, namely "isochronous transfer mode" and "asynchronous transfer mode".

The transmission packets based on these transfer modes are multiplexed on time-shared basis within a predetermined communication cycle (for example 125 μs). The isochronous transfer mode provides data transfer of a constant amount for each communication cycle, and effectively transfers data that has to be transmitted in continuous manner with a constant data rate, such as video data or audio data. The asynchronous transfer mode executes data transfer in asynchronous manner relative to the predetermined communication cycle, and effectively transfers data that is transferred non-periodically, such as control commands or file data.

Another feature is the function of constructing a bus-type network and relaying a packet, transmitted from a 1394 interface to another 1394 interface. Based on this function, a packet transmitted by the isochronous or asynchronous transfer mode can be transferred to the 1394 interfaces of all the digital devices on the network.

FIG. 1 shows the configuration of a conventional 1394 interface and of a digital device equipped with such 1394 interface.

In FIG. 1 there is shown a physical layer (Phy) 101 based on the IEEE 1394-1995 standard, having the functions of initialization (automatic recognition of connection configuration of the system and automatic setting of communication ID of the devices) in response to a change in the connection configuration of the system, arbitration of the bus use right, relaying of data to another node, encoding of a serial signal, output/detection of the bias voltage, etc. The physical layer 101 is provided with two communication ports 102, 103 each of which is connected to an external network through a twisted pair cable 104 based on the IEEE 1394-1995 standard. The twisted pair cable 104 serially transmits the digital information encoded by the DS-link encoding method in a digital device connected to the network.

A transmitter unit 105 transmits a packet, packetized according to the isochronous or asynchronous transfer mode, in a predetermined communication band. A transmission packet memory 107 is connected between the transmitter unit 105 and a transaction process unit 109 and stores a packet, packetized in the transaction process unit 109 based on the isochronous or asynchronous transfer mode. A receiver unit 106 sends a packet, received through the network, to a succeeding reception packet memory 108. The reception packet memory 108 is connected between the receiver unit 106 and the transaction process unit 109, and stores a packet received from the external network.

The transaction process unit 109 is connected, through an internal interface 110, to a system bus 111 provided singly in the digital device. The system bus 111 is connected to various process units 112–117 provided inside the digital device and adapted to execute predetermined processes on the digital data received from an external device or outputted from these process units.

The internal interface 110 of the 1394 interface 112 manages the digital data supplied from or to be supplied to the process units (113 to 117) connected to the system bus 111.

The process units connected to the system bus 111 include, for example, an image processing unit 113 for effecting data processing for displaying image data of a predetermined data format, an isochronous data transmission/reception control register (Iso Tr. Reg.) 114, a bus management register (CSR's) 115, a memory 116, and a control unit 117 equipped with a microcomputer and adapted to control the various process units within the digital device. The system bus 111 shown in FIG. 1 can be composed, for example, of a PCI bus.

The digital device provided with the 1394 interface of the above-described configuration has been associated with the following drawbacks.

In the above-described configuration, any data transmitted (or received) according to either of the two (isochronous and asynchronous) transfer modes must first be stored in the transmission packet memory 107 (or reception packet memory 108) which is singly provided in the device. For this reason, there is required complex control or management of the timing of data write-in or read-out based on either transfer mode.

Also, any data transmitted (or received) according to either of the two transfer modes must be processed through the transaction process unit 109, the internal interface 110 and the system bus 111, each of which is singly provided in the device. For this reason, with an increase in the frequency of communication with other digital devices, the data amount supplied from the transaction process unit 109 and other process units 113–117 to the system bus 111 increases, resulting in increased traffic therein.

In particular, in case of transmitting (or receiving) data requiring a high data transfer rate and real time processing, such as moving image data, the complete processing of such data may become impossible depending of the traffic status of the system bus 111. As a result, there may be encountered a situation where the internally processed moving image is interrupted in the course of processing or the transmission (or reception) has to be repeated from the beginning.

SUMMARY OF THE INVENTION

An object of the present invention is to solve the above-described drawbacks.

Another object of the present invention is, in a communication apparatus, a method and a digital interface therefor, to reduce complexity of the communication process in the digital device and to realize smooth communication with an external network.

As a preferred embodiment for such objects, the present invention discloses a communication apparatus comprising;

a communication unit having a first communication mode and a second communication mode;

a first unit for processing data transmitted or received utilizing a first internal bus and based on the first communication mode; and a second unit for processing data transmitted or received utilizing a second internal bus and based on the second communication mode.

As another embodiment for such objects, there is a communication apparatus comprising:

a reception unit for receiving data transmitted in plural different communication modes;

plural memories for storing data, received by the reception unit, respectively for the plural different communication modes; and plural process units for processing data, stored in the plural memories, respectively for the plural different communication modes.

As still another embodiment for such objects, there is disclosed a communication apparatus comprising:

a first communication unit for controlling transmission/reception based on a first communication mode;

a second communication unit for controlling transmission/reception based on a second communication mode; and a setting unit for setting transmission/reception based on the second communication mode, utilizing the communication mode.

As still another embodiment for such objects, there is disclosed a communication apparatus comprising:

a communication unit having a synchronous transfer mode and an asynchronous transfer mode;

a first internal bus for supplying data transmitted or received in the synchronous transfer mode; and a second internal bus for supplying data transmitted or received in the asynchronous transfer mode.

As still another embodiment for such objects, there is disclosed a digital interface comprising:

a first communication unit for controlling transmission/reception based on a synchronous transfer mode;

a second communication unit for controlling transmission/reception based on an asynchronous transfer mode;

a first memory for temporarily storing data transmitted or received in the synchronous transfer mode; and a second memory for temporarily storing data transmitted or received in the asynchronous transfer mode.

As still another embodiment for such objects, there is disclosed a communication method comprising steps of:

discriminating whether to execute a first communication mode or a second communication mode;

processing data transmitted or received by the first communication mode, utilizing a first internal bus; and processing data transmitted or received by the second communication mode, utilizing a second internal bus.

As still another embodiment for such objects, there is disclosed a communication method comprising steps of:

receiving data transmitted by plural different communication modes;

storing the received data in plural memories respectively for the plural different communication modes; and processing the data stored in the plural memories respectively for the plural different communication modes.

As still another embodiment for such objects, there is disclosed a communication method comprising steps of:

controlling transmission and reception based on a first communication mode;

setting transmission and reception based on a second communication mode, utilizing the first communication mode; and controlling transmission and reception based on the second communication mode.

As still another embodiment for such objects, there is disclosed a communication method comprising steps of:

effecting transfer based on a synchronous transfer mode and an asynchronous transfer mode;

supplying data transmitted or received in the synchronous transfer mode to a first internal bus; and supplying data transmitted or received in the asynchronous transfer mode to a second internal bus.

Still other objects of the present invention, and the advantages thereof, will become fully apparent from the following detailed description of the embodiments.

BRIEF DESCRIPTION OF THE DRAWINGS

FIG. 9 is a flow chart showing the reception sequence of the 1394 interface embodying the present invention.

DETAILED DESCRIPTION OF THE PREFERRED EMBODIMENTS

The preferred embodiments of the present invention will now be described in detail hereinafter with reference to the accompanying drawings.

Figure 1:
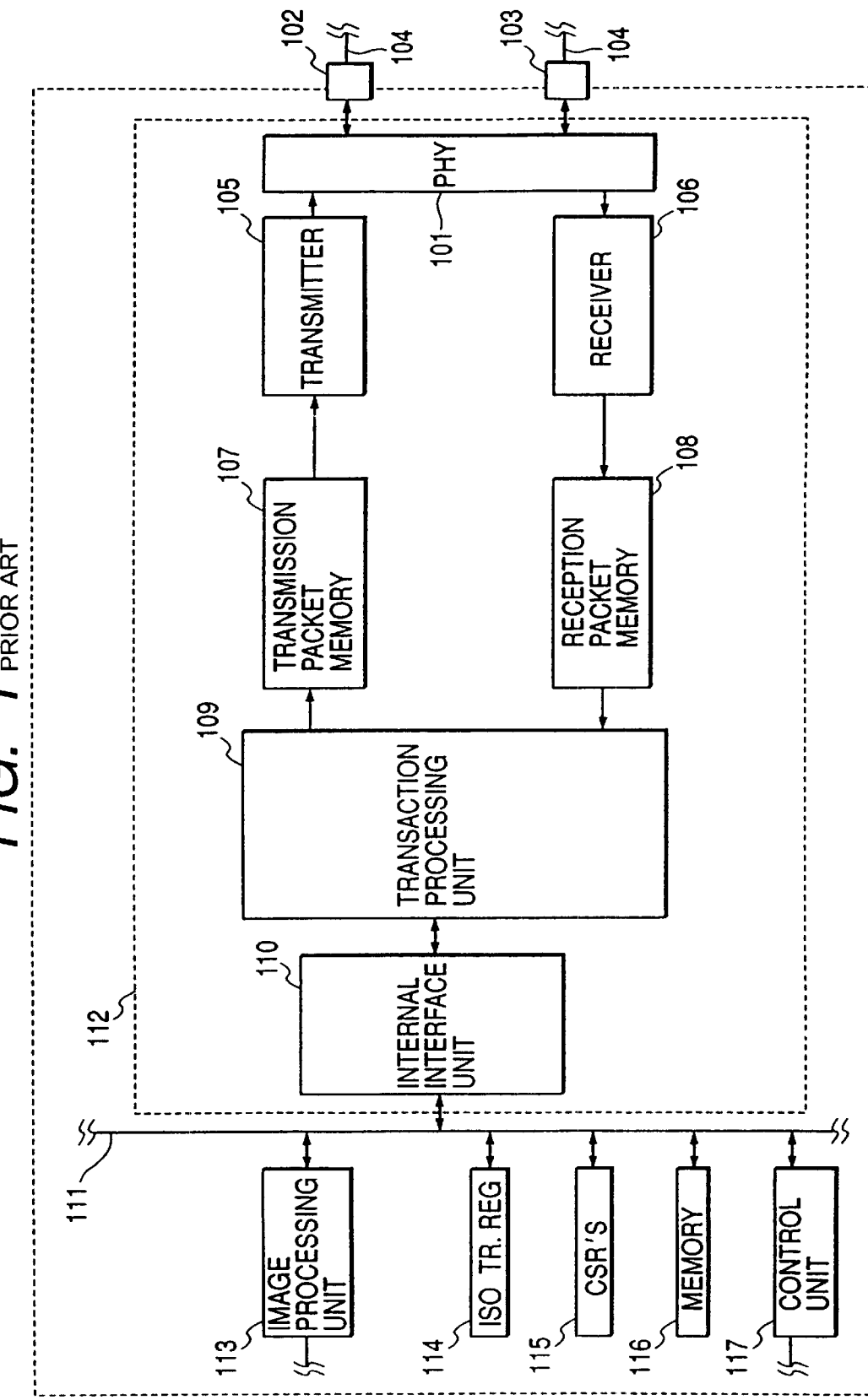
FIG. 1 is a block diagram showing the configuration of a conventional digital device.
Figure 2B:
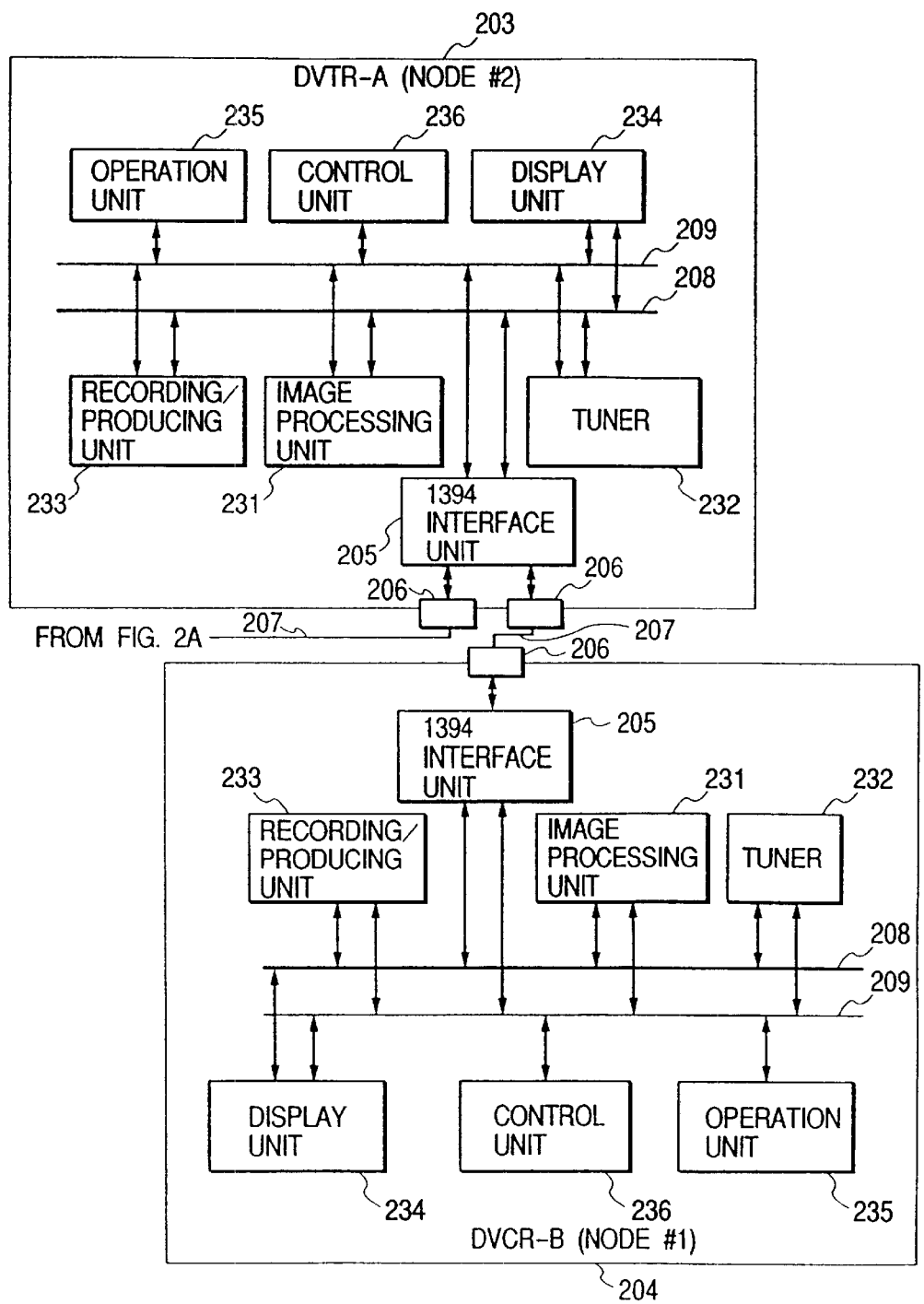
FIG. 2 is comprised of FIGS. 2A and 2B illustrating block diagrams showing an example of the configuration of a communication system composed of digital devices embodying the present invention.

FIGS. 2A and 2B are views showing an example of the configuration of a communication system composed of the digital devices embodying the present invention. In the system shown in FIGS. 2A and 2B, each digital device is equipped with a 1394 interface 205 embodying the present invention. The configuration of the 1394 interface of the present embodiment will be described in detail with reference to FIG. 6.

Referring to FIGS. 2A and 2B, there are shown a digital camcorder (DVCR) 201, a digital television 202, a digital video cassette recorder (DVTR-A) 203, and a digital video cassette recorder (DVTR-B) 204 similar in functions to the DVTR-A. Each of the devices 201 to 204 is equipped with a 1394 interface 205 and is connected with a communication port 206 through a communication cable 207. Also, each of the devices 201 to 204 is provided therein with two different buses, namely a data bus 208 and a system bus 209. In the present embodiment, the data bus 208 carries data that has to be processed in continuous manner, such as image data or audio data, while the system bus 209 carries, when necessitated, control commands for controlling the process units provided in each device.

In the following will be explained the configuration of the DVCR 201. A camera unit 211 converts the optical image of an object into an electrical signal, thereby generating image data of a predetermined format. An image process unit 212 converts the image data of the predetermined format (for example of NTSC system among the standard television systems), generated in the camera unit, into a format suitable for display or communication. A display unit 213 displays the image data supplied from the image process unit 212. An operation unit 214 operates the function of the DVCR 201. A control unit 215 includes a microcomputer and controls the functions of the various process units in the DVCR 201.

In the following there will be explained the configuration of the TV 202. An image process unit 221 converts the image data of the predetermined format (for example of NTSC system among the standard television systems), entered through the 1394 interface 205 or a tuner 223, into a format suitable for display or communication. An audio process unit 222 converts the audio data of the predetermined format, entered through the 1394 interface 205 or the tuner 223, into a format suitable for display or communication. A display unit 224 visually displays the image data supplied from the image process unit 221. An operation unit 225 operates the function of the TV 202. A control unit 226 includes a microcomputer and controls the functions of the various process units in the TV 202. The display unit 224 can also audibly output the audio data supplied from the audio process unit 222.

In the following there will be explained the configuration of the DVTR-A 203. An image process unit 231 converts the image data of the predetermined format (for example of NTSC system among the standard television systems), entered through the 1394 interface 205 or a tuner 232, into a format suitable for display or communication. A recording/reproducing unit 233 records the image data, supplied from the 1394 interface 205 or the image process unit 231 or the tuner 232, on a predetermined recording medium or reproduces such image data from the recording medium. A display unit 234 visually displays the image data supplied from the image process unit 231. An operation unit 235 operates the function of the DVTR-A 203. A control unit 236 includes a microcomputer and controls the functions of the various process units in the DVTR-A 203. The DVTR-B 204 is similar in configuration to the DVTR-A 203.

In the following there will be explained the basic functions of the 1394 interface 205 of the present embodiment.

The 1394 interface 205 is capable of automatically detecting a change in the connection configuration, resulting from the start of power supply or the connection or disconnection of a cable. After detecting the change in the connection, the 1394 interface 205 automatically executes initialization and re-recognition of the connection configuration. Also the 1394 interface 205 executes setting, on each digital device (hereinafter called "node") constituting the communication system, of a physical address (hereinafter called "node ID") for identifying the node.

The re-recognition of the connection configuration is started with automatic determination of the parent-child relationship of the nodes by the 1394 interface. As a result, the hierarchic structure of the entire communication system is automatically recognized. After such recognition of the hierarchic structure, a unique node becoming the parent of all other nodes executes the arbitration of the data communication in the communication system (such parent node being hereinafter called "root"). In the communication system of the present embodiment, there will be explained a case in which, as an example, the TV 202 is determined as the root.

The above-described setting of the node ID is started after the determination of the root. The node ID setting is executed sequentially, starting from a node connected to only one node, and finally at the node constituting the root. In the present embodiment there will be explained, as an example, a case in which a node ID "#0" is set at the DVCR 201, "#1" at the DVTR-B 204, "#2" at the DVTR-A 203 and "#3" at the TV 202.

Figure 3:
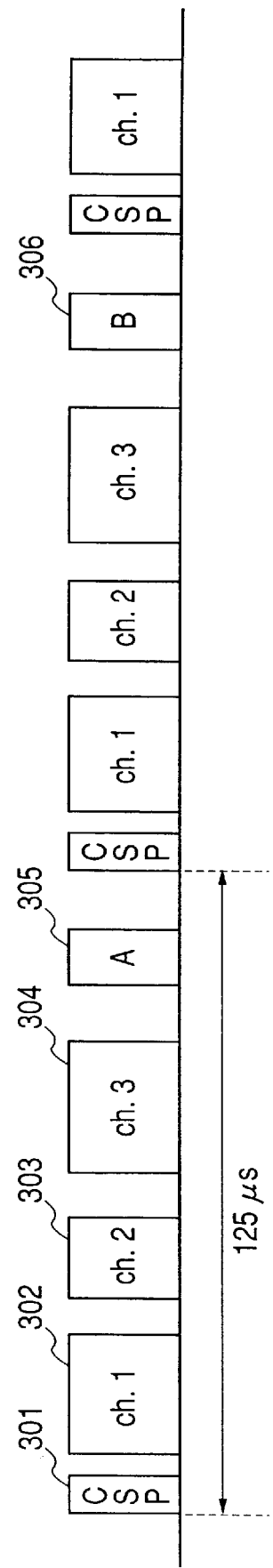
FIG. 3 is a view showing transition of isochronous and asynchronous packets in time within a communication cycle.

In the following there will be explained in detail, with reference to FIG. 3, the two transfer modes, namely the isochronous transfer mode and the asynchronous transfer mode. FIG. 3 shows an example of transition in time of the two transfer modes.

As shown in FIG. 3, the transmission packets based on the two transfer modes are multiplexed on a time-shared basis within the predetermined communication cycle (for example 125 $\mu$s). In FIG. 3, there are shown transmission packets 302 to 304 based on the isochronous. transfer mode and transmission packets 305, 306 based on the asynchronous transfer mode.

The isochronous transfer mode guarantees data transfer of a constant amount within each predetermined communication cycle and effectively transfers data that has to be transmitted in continuous manner at a constant data transfer rate, such as image data or audio data. Also, the asynchronous transfer mode executes data transfer in asynchronous manner relative to the predetermined communication cycle, and effectively transfers data that is transferred non-periodically, when necessitated, such as control command or file data. Further, as shown in FIG. 3, the isochronous transfer mode has a higher priority than the asynchronous transfer mode within a communication cycle time and it is guaranteed that the packet based on the isochronous transfer mode is transferred in each communication cycle.

Referring to FIG. 3, a packet 301 is called a cycle start packet (CSP) containing time data required for measuring a time substantially common to the nodes present on the communication system. The CSP 301 is transferred by a node, which is called the cycle master and manages the communication cycle time, to all devices present on the communication system. The isochronous transfer mode is initiated after the lapse of a predetermined idle time from the transfer of the CSP 301.

Figure 4:
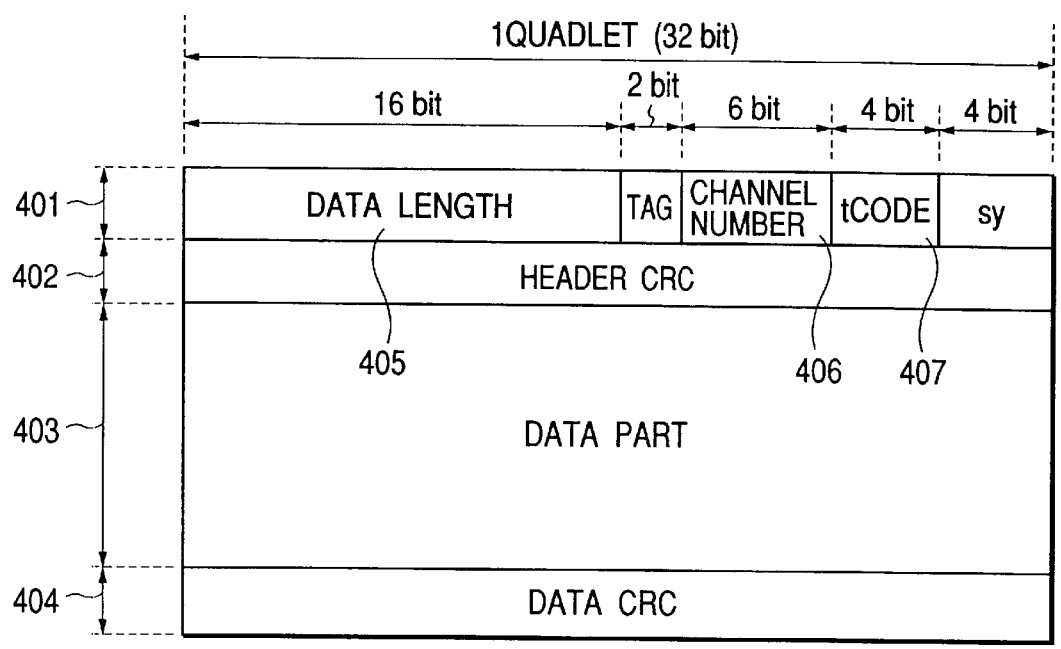
FIG. 4 is a view showing the configuration of an isochronous packet.

A mode having digital data that has to be transferred in synchronization with a predetermined communication cycle (for example moving image data or audio data) packetizes such digital data into plural packets based on the isochronous transfer mode and transfers such packets in a communication band assigned for each communication cycle (a packet based on the isochronous transfer mode is hereinafter called an "isochronous packet"). FIG. 4 shows the configuration of an isochronous packet.

Referring to FIG. 4, the isochronous packet is composed of a header portion 401, a header CRC 402, a data portion 403 and a data CRC 404. The header portion 401 contains a field 405 for storing data indicating the data length of the data portion 403, a field 406 for storing data indicating the channel number of the isochronous packet, and a field 407 for storing data (transaction mode (tcode)) identifying the format of the packet and the process to be executed.

In the execution of the isochronous transfer mode, each node in advance acquires a communication band for transferring the isochronous packet in each communication cycle and a channel number assigned to such communication band, and transmits the isochronous packet containing such channel number to such communication band. A receiving device selects a predetermined channel number, and can receive the packet of such channel number. In the present embodiment, 302 in FIG. 3 indicates an isochronous packet output from the DVCR 201 and having a channel number "ch. 1". Also, an isochronous packet 303 in FIG. 3 is output from the DVTR-A 203 and has a channel number "ch. 2". An isochronous packet 304 is output from the DVTR-B 204 and has a channel number "ch. 3".

In FIG. 3 there are also shown packets 305, 306 packetized according to the asynchronous transfer mode (hereinafter called asynchronous packets). The data communication based on the asynchronous transfer mode is executed, after the completion of the communication in the isochronous transfer mode, within a predetermined period before the next communication cycle. The data transferred by the asynchronous transfer mode is that data not requiring continuous communication in every predetermined period, such as control commands. For example, the control command for controlling the recording operation (start, pause, stop, etc.) of the recording device (such as DVTR-A 203 or DVTR-B 204) which receives and records the isochronous packet on the network, can be transferred by the asynchronous transfer mode. Also, the control command for controlling the transmitting operation (start, pause, stop, etc.) of the display device (such as TV 202) which receives and displays the moving image data which is isochronous transferred on the network, can be transferred by the asynchronous transfer mode.

Figure 5:
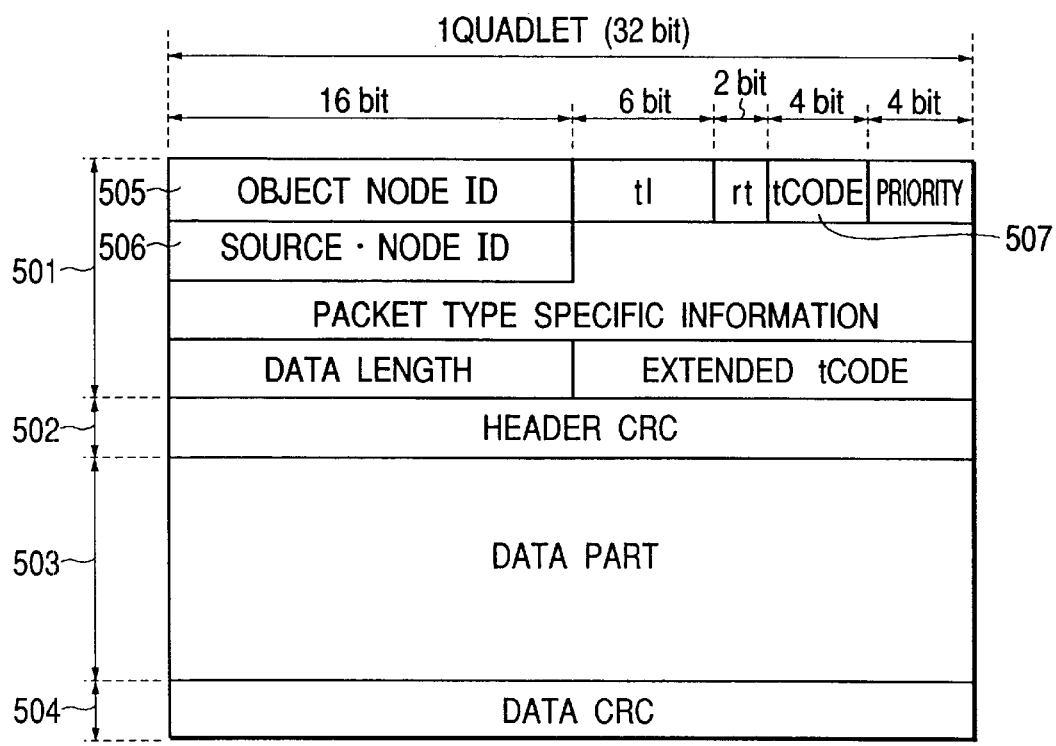
FIG. 5 is a view showing the configuration of an asynchronous packet.

FIG. 5 shows the configuration of the asynchronous packet. Referring to FIG. 5, the asynchronous packet is composed of a header portion 501, a header CRC 502, a data portion 503 and a data CRC 504. The header portion 501 contains a field 505 for storing the node ID of the destination node, a field 506 for storing the node ID of the source node, and a field 507 for storing data (transaction mode (tcode)) identifying the format of the packet and the process to be executed.

Figure 6:
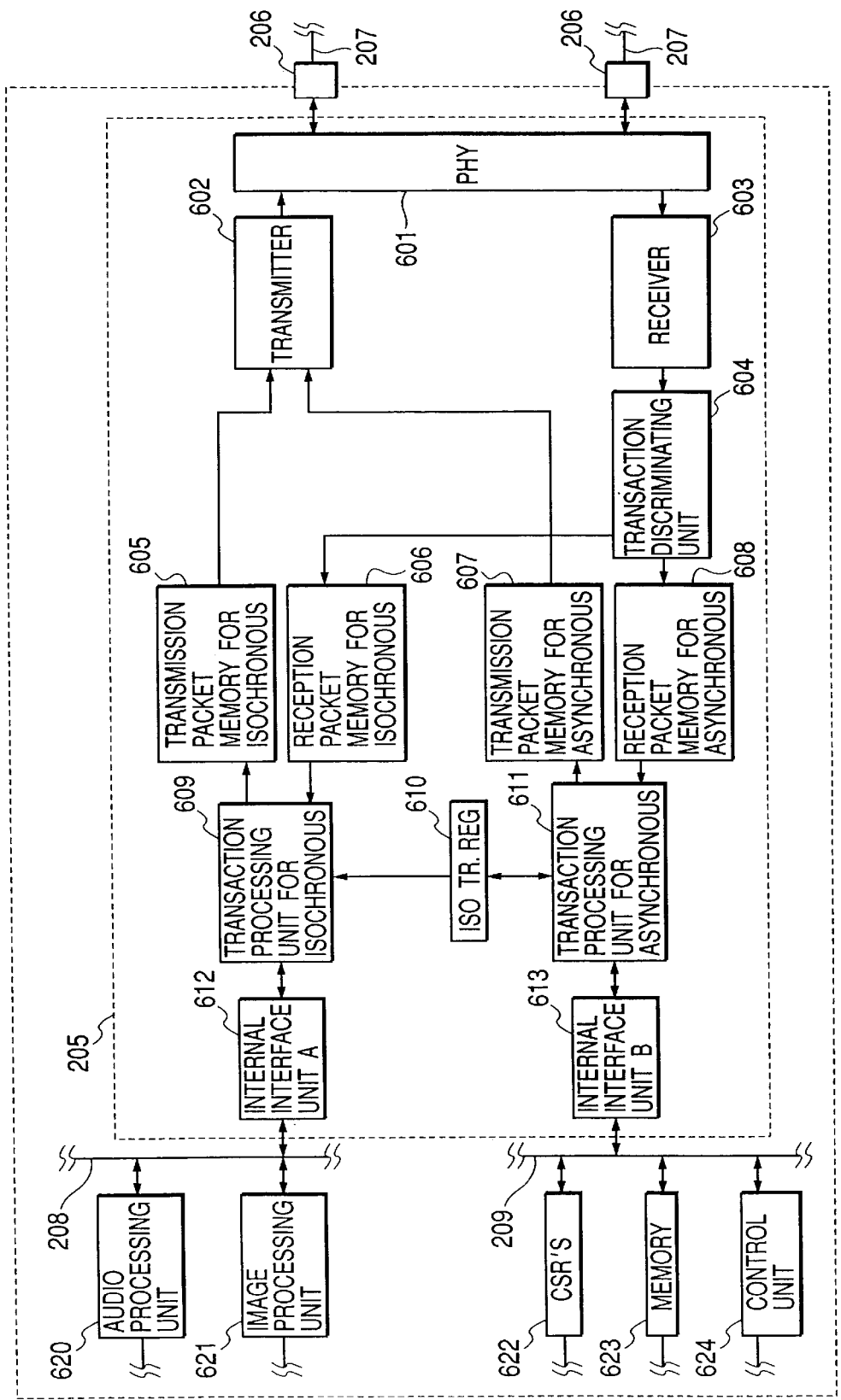
FIG. 6 is a block diagram showing the configuration of a digital device embodying the present invention.

FIG. 6 is a block diagram showing the detailed configuration of the 1394 interface 205 of the present embodiment. In FIG. 6, components equivalent in function or process to those in FIGS. 2A and 2B are represented by corresponding numbers and will not be explained further.

601 indicates a physical layer (Phy) based on the IEEE 1394-1995 standard, having the functions of initialization (aforementioned automatic recognition of connection configuration of the system and aforementioned automatic setting of mode ID) in response to a change in the connection configuration of the system, arbitration of the bus use right, output/detection of the bias voltage, etc. The physical layer 601 is provided with two communication ports 206, each of which is connected to an external network through a twisted pair cable 207 based on the IEEE 1394-1995 standard. The twisted pair cable 207 serially transmits the digital information encoded by the DS-link encoding method.

A transmitter unit 602 transmits a packet, packetized according to the isochronous or asynchronous transfer mode, in a predetermined communication band. The isochronous packet is generated in an isochronous transaction process unit 609, then temporarily stored in an isochronous transmission packet memory 605 and supplied in succession to a transmitter unit 602. Also, the asynchronous packet is generated in an asynchronous transaction process unit 611, then temporarily stored in an asynchronous transmission packet memory 607 and supplied to the transmitter unit 602.

A receiver unit 603 sends a packet, received through the network, to a succeeding transaction discrimination unit 604, which discriminates the kind of the packet received by the receiver unit 603, namely whether it is transferred in the isochronous transfer mode or in the asynchronous transfer mode. The transfer mode of the received packet can be identified by checking the transaction mode (tcode) contained in the header portion of the packet. As explained in relation to FIGS. 4 and 5, the transaction mode (code) defines the format of the packet and the kind of transaction to be executed at the reception of the packet (for example the synchronous transfer mode contains read-out, write-in and locking).

In case the transaction discrimination unit 604 identifies that the received packet is an isochronous packet, such packet is stored in an isochronous reception packet memory 606. Also, in case the received packet is identified as an asynchronous packet, it is stored in an asynchronous reception packet memory 608.

The isochronous packets stored in the isochronous reception packet memory 606 are supplied in succession to an isochronous transaction process unit 609 and are subjected to a transaction process matching each packet. Also, the asynchronous packets stored in the asynchronous reception packet memory 608 are supplied in succession to an asynchronous transaction process unit 611 and are subjected to a transaction process matching each packet.

In the present embodiment, as explained in the foregoing, the transactions for the packets transmitted or received according to the isochronous transfer mode and those transmitted or received according to the asynchronous transfer mode are executed in separate process units (namely separate memories and separate transaction process units). It is thus rendered possible to process the communication packets based on the plural transfer modes in parallel manner.

Figure 7:
FIG. 7 is a view showing the configuration of a register for controlling the communication based on the isochronous transfer mode.

An isochronous data transmission/reception control register (Iso. Tr. Reg.) 610 is used in common for the isochronous transaction process unit 609 and the asynchronous transaction process unit 611, and, unlike the conventional configuration, is not connected to the system bus. FIG. 7 shows an example of the configuration of the isochronous data transmission/reception control register 610. The register 610 serves to control the communication, according to the isochronous transfer mode, between the 1394 interface 205 and another 1394 interface.

Referring to FIG. 7, there are shown a connection bit space 701 indicating the logical connection relationship with the 1394 interface of another digital device effecting isochronous communication with the 1394 interface 205 and a channel bit space 702 indicating the channel number used by the packet based on the isochronous transfer mode. The content of the register 610 is read or written by the asynchronous transaction process unit 611.

In the case of communication based on the isochronous transfer mode, the 1394 interface 205 of the transmitting device has to secure a communication band required for transmitting the isochronous packet and a channel number assigned to such communication band. The securing of the communication band and the channel number is achieved by the asynchronous communication. After the communication band and the channel number are secured, the 1394 interface 205 sets the connection bit space 701 of the isochronous data transmission/reception control register 610 and sets the channel number, supplied from the asynchronous transaction process unit 611, in the channel bit space 702.

Also the isochronous transaction process unit 609 always monitors the isochronous data transmission/reception control register 610 re-written by the asynchronous transaction process unit 611, and activates or terminates the communication in the isochronous transfer mode according to the content of such register.

The asynchronous transaction process unit 611 is connected through an internal interface unit B 613 to the system bus 209 provided in the digital device. The system bus 209 is connected to the various process units provided in the digital device. The process units execute predetermined processes on the digital data contained in the packet received from an external device, and supply the internal interface unit B 613 in the 1394 interface 205 with the digital data to be asynchronous transferred to another digital device.

The process units connected to the system bus 209 include, for example, a bus management register (CSR's) 622, a memory 623 storing information of the digital devices constituting the communication system, and a control unit 624 for controlling the process units in the digital device. The data bus 209 shown in FIG. 6 can be composed, for example, of a PCI bus.

The isochronous transaction process unit 609 is connected, through an internal interface unit A 612, to a data bus 208 provided in the digital device and connected, for example, to an audio process unit 620 and an image process unit 621. The image process unit 621 executes data processing for display, printing, editing, etc., on the image data of a predetermined format. Similarly the audio process unit 620 executes data processing for outputting or editing on the audio data of a predetermined format. The data bus 208 is made independent from the system bus 209 connected to the internal interface unit B 613, whereby the isochronous transaction process unit 609 can exchange data solely with the audio process unit 620 and the image process unit 621 connected to the data bus 208. Stated differently, the data bus 208 can be supplied with the image data and the audio data which are isochronous transferred in every communication cycle.

Figure 8:
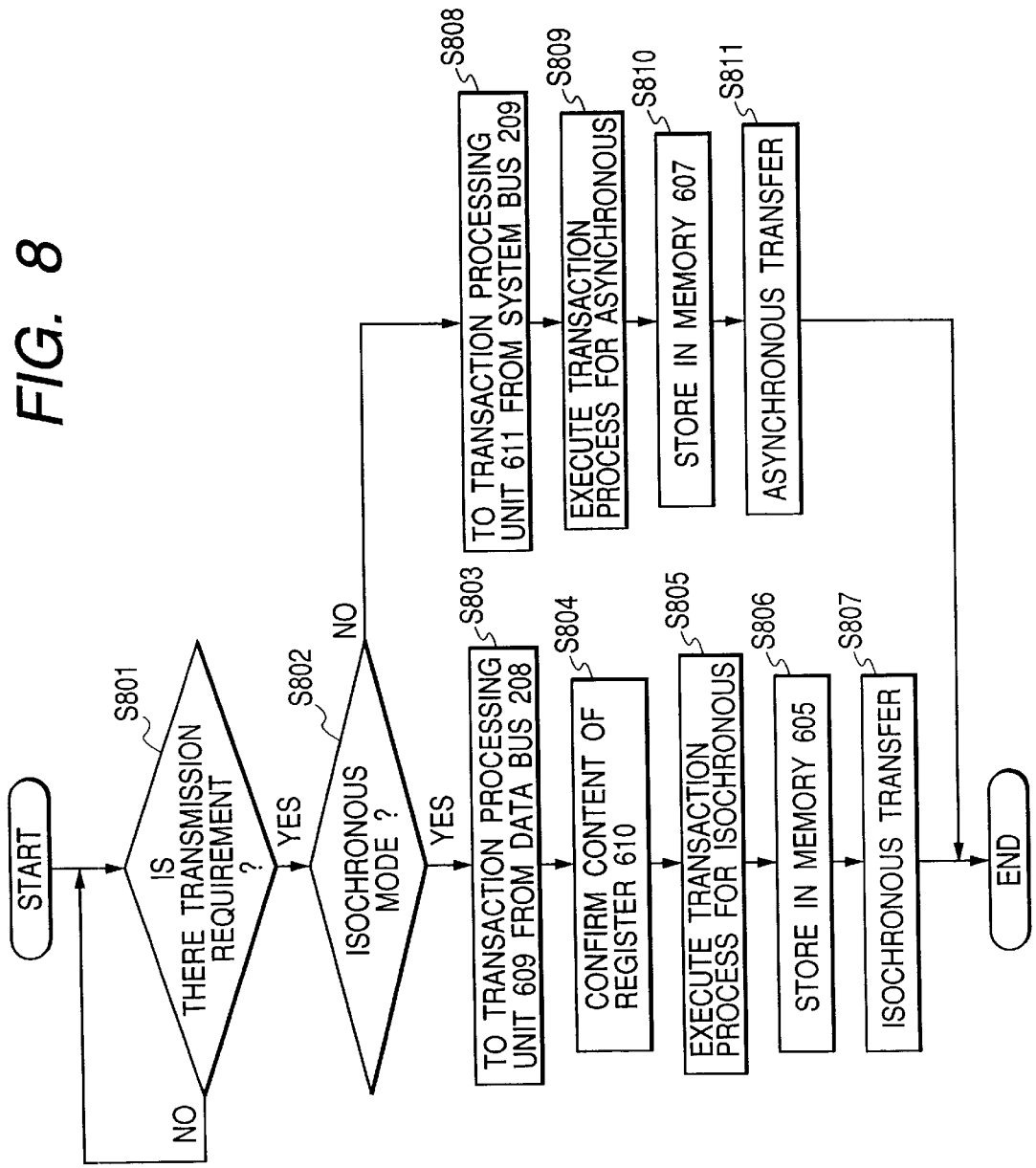
FIG. 8 is a flow chart showing the transmission sequence of the 1394 interface embodying the present invention.

In the following there will be explained, with reference to FIGS. 8 and 9, the procedure of transmission and reception in the 1394 interface of the present embodiment. FIG. 8 is a flow chart showing the transmission sequence while FIG. 9 is a flow chart showing the reception sequence.

Now reference is made to FIG. 8 for explaining the transmission sequence.

At first the 1394 interface 205 discriminates whether a request for transmission is present (step S801).

If present, the 1394 interface 205 discriminates whether the request is based on the isochronous transfer mode or on the asynchronous transfer mode (step S802).

In the case of transmission based on the isochronous transfer mode, the 1394 interface 205 enters the digital data, supplied from the data bus 208 to the internal interface unit A 612, in succession into the transaction process unit 609 (step S803). As explained in the foregoing, the digital data supplied from the data bus 208 is data that must be transmitted in continuous manner at a predetermined time interval (such as moving image data or audio data).

The transaction process unit 609 confirms the content of the register 610 shown in FIG. 7, prior to the packetizing of the input digital data into the isochronous packet shown in FIG. 4 (step S804).

Based on the content of the register 610, the transaction process unit 609 sets the channel number of the isochronous packet to be next transmitted and designates the transaction code etc. of the isochronous packet.

The isochronous packets generated in the transaction process unit 609 are stored in succession in the isochronous transmission packet memory 605 (step S806).

The isochronous packets stored in the memory 605 are transmitted, through the transmitter unit 602 and the physical layer 601, in the communication band set in advance in each communication cycle period (step S807).

Also, in case the transmission request in step S802 is for transmission based on the asynchronous transfer mode, the 1394 interface 205 enters the digital data, supplied from the system bus 209 to the internal interface unit B 613, into the transaction process unit 611 (step S808). As explained in the foregoing, the digital data supplied from the system bus 209 in this case is control commands and file data, that have to be transmitted non-periodically, whenever needed.

The transaction process unit 611 packetizes the input digital data into the asynchronous packet shown in FIG. 5 (step S809).

The asynchronous packets generated in the transaction process unit 611 are stored in the asynchronous transmission packet memory 607 (step S810).

The asynchronous packets stored in the memory 607 are transmitted, through the physical layer 601, within the period capable of asynchronous transfer explained in relation to FIG. 3 (step S811).

In the foregoing there has been explained the transmission sequence in the 1394 interface of the present embodiment.

In the following there will be explained the reception sequence with reference to FIG. 9.

At first the 1394 interface 205 discriminates whether a packet has been received (step S901).

If received, the received packet is supplied, through the physical layer 601 and the receiver unit 603, to the transaction discrimination unit 604, which checks the content of the transaction code (tcode) contained in the header portion of the packet (step S902).

Based on the transaction code, the transaction discrimination unit 604 discriminates whether the received packet is a transmission packet based on the isochronous transfer mode (namely an isochronous packet), or a transmission packet based on the asynchronous transfer mode (namely an asynchronous packet) (step S903).

In the case of an asynchronous packet, the transaction discrimination unit 604 stores such isochronous packet in the isochronous reception packet memory 606 (step S904).

The isochronous packet stored in the memory 606 is supplied to the transaction process unit 609, which confirms the content of the register 610 shown in FIG. 7, prior to processing of the received isochronous packet (step S905).

The transaction process unit 609 executes the transaction of the received isochronous packet, based on the content of the register 610 and the transaction code (step S906).

Further, the transaction process unit 609 depacketizes the received isochronous packet and sends the digital data of a predetermined amount, contained in the data portion of the packet, to the data bus 208 through the internal interface unit A 612 (step S907). As explained in the foregoing, the digital data supplied to the data bus 208 is data to be continuously transmitted at a predetermined time interval, such as moving image data or audio data.

Also, in the case step S903 identifies that the received packet is an asynchronous packet, the transaction discrimination unit 604 stores the asynchronous packet in the asynchronous reception packet memory 608 (step S908).

The asynchronous packet stored in the memory 608 is supplied to the transaction process unit 611, which executes the transaction based on the transaction code of the received asynchronous packet (step S909).

In a case where the received asynchronous packet requests write-in of the register 610, the transaction process unit 611 writes the content of the register 610 (steps S910, S911). Thus a new logical connection relationship for executing the communication based on the isochronous transfer mode is established between the 1394 interface 205 and another 1394 interface. Also, in the case where the asynchronous packet requests read-out of the register 610, the transaction process unit 611 reads the content of the register 610 and generates and returns an asynchronous packet containing such content (steps S910, S911).

In a case where the received asynchronous packet does not request the write-in or read-out of the register 610, the transaction process unit 901 depacketizes the received isochronous packet and sends the digital data of the data portion thereof to the system bus 209 through the internal interface unit B 613 (step S912). As explained in the foregoing, the digital data supplied to the system bus 209 in this case is control commands or file data that have to be transmitted whenever required, in a non-periodic manner.

In the foregoing there has been explained the reception sequence in the 1394 interface 205 of the present embodiment.

As explained in the foregoing, the 1394 interface of the present embodiment can separately execute the transaction process for the packet transmitted or received in the isochronous transfer mode and that for the packet transmitted or received in the asynchronous mode. Also, the 1394 interface of the present embodiment can send the digital data contained in the packets of these transfer modes respectively to the different internal buses. Thus, the digital data contained in an asynchronous packet does not hinder the processing of the digital data that has to be continuously processed in every predetermined cycle (namely moving image data or audio data contained in the isochronous packets).

Also, in the digital device of the present embodiments, the digital information transmitted or received in the two different transfer modes can be processed, respectively through different internal buses, by the various process units of the device. It is thus rendered possible to avoid increase in the traffic on the system bus and to realize data processing without stagnation. It is also possible to process, in parallel manner, the digital information of different properties, namely the digital information transmitted or received in synchronization with the predetermined communication cycles, such as the moving image data or audio data, and the digital information transmitted or received in asynchronous manner to the predetermined communication cycle, such as a control command.

The invention may be embodied in other specific forms without departing from the spirit or essential characteristics thereof.

For example, a digital interface based on the IEEE 1394 standard has been explained as an example of a digital interface equipped in a digital device of the present embodiment, but the present invention is not limited to such example. There may be employed any digital interface having the function, like the 1394 interface, of transmitting and receiving various digital information (moving image information, audio information, control command, etc.) through a single communication channel, utilizing a first transfer mode ensuring data transfer of a constant amount in every predetermined communication cycle and a second transfer mode executing data transfer in asynchronous manner relative to the predetermined communication cycle.

Also, in the present embodiment there has been explained a configuration in which data communicated in the two different communication modes is supplied, respectively through two different internal buses, to the various process units in the digital device, but the present invention is not limited to such configuration. For example, there may be employed a configuration of supplying data, communicated by two or more different communication modes, to various process units in the digital device, respectively through two or more different internal buses.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An apparatus connected to a digital interface having an isochronous transfer mode and an asynchronous transfer mode, said apparatus comprising:

an image processing unit that processes image data;

a control unit that controls the apparatus;

a first internal bus that connects the image processing unit and the digital interface, supplies image data to be transmitted in the isochronous transfer mode to the digital interface, and supplies image data received in the isochronous transfer mode to the image processing unit; and a second internal bus that connects the control unit and the digital interface, supplies data to be transmitted in the asynchronous transfer mode to the digital interface, and supplies data received in the asynchronous transfer mode to the control unit.

2. An apparatus according to claim 1, wherein said digital interface conforms to the IEEE 1394-1995 standard.

3. An apparatus connected to a digital interface having an isochronous transfer mode and an asynchronous transfer mode, said apparatus comprising:

an image generating unit that generates image data;

an image processing unit that processes image data;

a control unit that controls the apparatus;

a first internal bus that connects the image generating unit, the image processing unit and the digital interface, supplies image data to be transmitted in the isochronous transfer mode to the digital interface, and supplies image data received in the isochronous transfer mode to the image processing unit; and a second internal bus that connects the control unit and the digital interface, supplies data to be transmitted in the asynchronous transfer mode to the digital interface, and supplies data received in the asynchronous transfer mode to the control unit.

4. An apparatus according to claim 3, wherein the digital interface conforms to the IEEE 1394-1995 standard.

5. An apparatus connected to a digital interface having an isochronous transfer mode and an asynchronous transfer mode, said apparatus comprising:

a recording and reproducing unit that records and reproduces image data;

a control unit that controls the apparatus;

a first internal bus that connects the recording and reproducing unit and the digital interface, supplies image data to be transmitted in the isochronous transfer mode to the digital interface, and supplies image data received in the isochronous transfer mode to the recording and reproducing unit; and a second internal bus that connects the control unit and the digital interface, supplies data to be transmitted in the asynchronous transfer mode to the digital interface, and supplies data received in the asynchronous transfer mode to the control unit.

6. An apparatus according to claim 5, wherein the digital interface conforms to the IEEE 1394-1995 standard.

7. An apparatus connected to a digital interface having an isochronous transfer mode and an asynchronous transfer mode, said appararus comprising:

tuner that outputs image data;

an image processing unit that processes image data;

a control unit that controls the apparatus;

a first internal bus that connects the tuner, the image processing unit and the digital interface, supplies image data to be transmitted in the isochronous transfer mode to the digital interface, and supplies image data received in the isochronous transfer mode to the image processing unit; and a second internal bus that connects the control unit and the digital interface, supplies data to be transmitted in the asynchronous transfer mode to the digital interface, and supplies data received in the asynchronous transfer mode to the control unit.

8. An apparatus according to claim 7, wherein the digital interface conforms to the IEEE 1304-1995 standard.

9. An apparatus connected to a digital interface having an isochronous transfer mode and an asynchronous transfer mode, said apparatus comprising:

a tuner that outputs image data;

a recording unit that records image data;

a control unit that controls the apparatus;

a first internal bus that connects the tuner, the recording unit and the digital interface, supplies image data to be transmitted in the isochronous transfer mode to the digital interface, and supplies image data received in the isochronous transfer mode to the recording unit; and a second internal bus that connects the control unit and the digital interface, supplies data to be transmitted in the isochronous transfer mode to the digital interface, and supplies data received in the isochronous transfer mode to the control unit.

10. An apparatus according to claim 9, wherein the digital interface conforms to the IEEE 1394-1995 standard.

* * * * *

UNITED STATES PATENT AND TRADEMARK OFFICE
CERTIFICATE OF CORRECTION

PATENT NO. : 6,584,534 B1
DATED : June 24, 2003
INVENTOR(S) : Takashi Kobayashi

It is certified that error appears in the above-identified patent and that said Letters Patent is hereby corrected as shown below:

<u>Column 6,</u>
Line 36, "isochronous." should read -- isochronous --.

<u>Column 13,</u>
Line 33, "tuner" should read -- a tuner --.

<u>Column 14,</u>
Line 13, "IEEE 1304-1995" should read -- IEEE 1394-1995 --.

Signed and Sealed this

Twenty-seventh Day of January, 2004

JON W. DUDAS
*Acting Director of the United States Patent and Trademark Office*